(12) United States Patent
Kim et al.

(10) Patent No.: US 9,037,675 B2
(45) Date of Patent: May 19, 2015

(54) METHOD FOR PERFORMING INTER-USER EQUIPMENT TRANSFER IN WIRELESS COMMUNICATION SYSTEM BASED ON INTERNET PROTOCOL MULTIMEDIA SUBSYSTEM

(75) Inventors: Lae Young Kim, Anyang-si (KR); Tae Hyeon Kim, Anyang-si (KR); Hyun Sook Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/254,969

(22) PCT Filed: Mar. 15, 2010

(86) PCT No.: PCT/KR2010/001597
§ 371 (c)(1),
(2), (4) Date: Sep. 6, 2011

(87) PCT Pub. No.: WO2010/120048
PCT Pub. Date: Oct. 21, 2010

(65) Prior Publication Data
US 2011/0320569 A1 Dec. 29, 2011

(30) Foreign Application Priority Data
Apr. 17, 2009 (KR) .................. 10-2009-0033795

(51) Int. Cl.
*G06F 15/16* (2006.01)
*H04L 29/06* (2006.01)

(52) U.S. Cl.
CPC ......... *H04L 65/1093* (2013.01); *H04L 65/1016* (2013.01)

(58) Field of Classification Search
CPC .................. H04L 65/1006; H04L 67/148
USPC ......................... 709/227, 217, 231
See application file for complete search history.

(56) References Cited

U.S. PATENT DOCUMENTS

| | | | | |
|---|---|---|---|---|
| 7,171,228 B2 * | 1/2007 | Florkey et al. | ................ | 455/519 |
| 7,359,373 B2 * | 4/2008 | Kuusinen et al. | ............. | 370/352 |
| 7,467,190 B2 * | 12/2008 | Matsubara et al. | ........... | 709/219 |
| 7,990,957 B2 * | 8/2011 | Song et al. | .................. | 370/354 |
| 8,311,015 B2 * | 11/2012 | Wang et al. | .................. | 370/331 |

(Continued)

FOREIGN PATENT DOCUMENTS

| KR | 10-2007-0098372 A | 10/2007 |
|---|---|---|
| KR | 10-2007-0099849 A | 10/2007 |

(Continued)

*Primary Examiner* — Kevin Bates
*Assistant Examiner* — Clarence D McCray
(74) *Attorney, Agent, or Firm* — Birch, Stewart, Kolasch & Birch, LLP

(57) ABSTRACT

A method of performing inter-user equipment (UE) transfer (IUT) by an Internet protocol (IP) multimedia subsystem (IMS) network in an IMS-based network system is provided. The method includes receiving from a first UE a subscription message for requesting notification of state or capability information of another UE, transmitting to the first UE a subscription acceptance message in response to the subscription message, receiving from a second UE a control message comprising an IUT flag for indicating IUT enable or disable for media flows, and transmitting to the first UE a notification message comprising information on the second UE, if the IUT flag indicates IUT enable for the media flows. It is possible to decrease a signaling overhead caused by a failure of IUT of a media flow.

15 Claims, 9 Drawing Sheets

(56) References Cited

U.S. PATENT DOCUMENTS

| | | | |
|---|---|---|---|
| 8,385,903 B2* | 2/2013 | Ghai et al. | 455/420 |
| 8,514,870 B2* | 8/2013 | Ma et al. | 370/410 |
| 8,699,997 B2* | 4/2014 | Mildh et al. | 455/410 |
| 8,718,253 B2* | 5/2014 | Sharland et al. | 379/202.01 |
| 2003/0028622 A1* | 2/2003 | Inoue et al. | 709/219 |
| 2007/0047486 A1* | 3/2007 | Lee et al. | 370/329 |
| 2007/0224990 A1* | 9/2007 | Edge et al. | 455/436 |
| 2008/0020745 A1* | 1/2008 | Bae et al. | 455/422.1 |
| 2009/0185523 A1* | 7/2009 | Allen et al. | 370/328 |
| 2009/0185557 A1 | 7/2009 | Song et al. | |
| 2009/0319676 A1* | 12/2009 | Jin et al. | 709/228 |
| 2010/0279670 A1* | 11/2010 | Ghai et al. | 455/414.3 |
| 2010/0312832 A1* | 12/2010 | Allen et al. | 709/204 |
| 2011/0040836 A1* | 2/2011 | Allen et al. | 709/205 |
| 2011/0238845 A1* | 9/2011 | Keller et al. | 709/227 |
| 2011/0268262 A1* | 11/2011 | Jones et al. | 379/202.01 |
| 2011/0268263 A1* | 11/2011 | Jones et al. | 379/202.01 |
| 2011/0268418 A1* | 11/2011 | Jones et al. | 386/200 |
| 2011/0270936 A1* | 11/2011 | Guthrie et al. | 709/206 |
| 2011/0271210 A1* | 11/2011 | Jones et al. | 715/753 |
| 2011/0320569 A1* | 12/2011 | Kim et al. | 709/217 |
| 2012/0011257 A1* | 1/2012 | Kim et al. | 709/227 |
| 2012/0311026 A1* | 12/2012 | Yi et al. | 709/203 |
| 2013/0159424 A1* | 6/2013 | Georg et al. | 709/205 |
| 2013/0315079 A1* | 11/2013 | Edge | 370/252 |

FOREIGN PATENT DOCUMENTS

WO    WO 2005/039132 A1    4/2005
WO    WO 2010120048 A2 *    10/2010

* cited by examiner

METHOD FOR PERFORMING INTER-USER EQUIPMENT TRANSFER IN WIRELESS COMMUNICATION SYSTEM BASED ON INTERNET PROTOCOL MULTIMEDIA SUBSYSTEM

TECHNICAL FIELD

The present invention relates to an Internet protocol (IP) multimedia subsystem (IMS)-based system, and more particularly, to a method of performing inter-user equipment (UE) transfer (IUT).

BACKGROUND ART

An Internet protocol (IP) multimedia subsystem (IMS) is drawing attention as a core communication system for providing a new service in an IP-based next generation communication environment. The IMS provides a variety of multimedia services in a mobile communication network environment and integrates an IP network and a mobile communication environment as a set of nodes for performing call control. Therefore, the IMS facilitates an interoperation between a user terminal and the IP network, so that an IP-based multimedia service can be provided by using the user terminal. The IMS consists of three layers, that is, a connectivity layer for connection to the IMS, a control layer for managing call and session routing, accounting, and file protocols, and an application layer for storing and managing data and generating a service for a subscriber.

The IMS can support a variety of contents types (e.g., voice, multimedia data, text, etc.) by interoperating with an existing telephone network (i.e., public switched telephone network (PSTN)) and the Internet. An IP-based multimedia service provided by the IMS can be roughly classified into a messaging service, a voice service, and a video service. The message service includes a short messaging service (SMS), a multimedia messaging service (MMS), an e-mail service, a session initiation protocol (SIP) for instant messaging and presence leveraging extensions-instant message (SIMPLE-IM) service, an instant messaging and presence service (IMPS), etc. The voice service includes a voice over IP (VoIP) service, a push-to-talk over cellular (PoC) service, etc. The video service includes a video-over IP (Video-oIP), etc.

These services have their own protocol silos to transmit respective messages. That is, these services transmit the messages by using a transport protocol unique for each service. A transport protocol currently used by each service is summarized by Table 1 below.

TABLE 1

| Service Type | Transfer Protocol |
| --- | --- |
| SMS | Call Signaling Protocol |
| MMS | WSP (Wireless Session Protocol) or HTTP (Hyper text Transfer Protocol) |
| E-mail | IETF (Internet Engineering Taskforce Team) Lemonade IMAP (Internet Messaging Access Protocol), DS (Data Synchronization) |
| SIMPLE-IM | SIP (Session Initiation Protocol)/SIMPLE and MSRP (Message Session Relay Protocol) |
| IMPS | WSP or HTTP |
| VoIP | SIP/RTP (Real-time Transport Protocol) |
| PoC | SIP/RTP |
| Video_oIP | SIP/RTP |

Referring to Table 1, the IMS uses a session initiation protocol (SIP) which is a signaling protocol usable for the IP-based multimedia service. The SIP is a call control protocol of the application layer for generating, modifying, and ending an IP-based multimedia service session between user terminals or between a user terminal and an entity having an IP address by finding a location of a remote user terminal to which communication is desired.

In an IMS system, a plurality of user equipments (UEs) may be involved in a collaborative session. In this case, one UE can control media flows within the collaborative session, whereas the remaining UEs perform transmission and reception of the media flows. As such, a UE that provides service control for the collaborative session is referred to as a controller UE, and controlled UEs that provide the media flows to the collaborative session are referred to as controllee UEs. A controller UE may provide media flows for a collaborative session. A function of transferring a media flow for a specific UE to a different UE, adding a media flow to a different UE or removing a media flow generated in the different UE is referred to as inter-UE transfer (IUT) of the media flow.

When performing the IUT, whenever a state or capability of a different UE changes, it is notified to a UE which requests notification of the state or capability information of the different UE. Among different UEs, some of them may not be able to perform the IUT depending on situation. If the change in the state or capability of the UE that cannot perform the IUT depending on its situation is notified to the different UE, a signaling overhead occurs. In addition, a controller UE may attempt to perform the IUT for a UE that cannot perform the IUT, which can cause a signaling overhead when the IUT operation fails. Accordingly, there is a need for a method of effectively performing the IUT.

DISCLOSURE OF INVENTION

Technical Problem

The present invention relates to a method of effectively performing inter-user equipment (UE) transfer (IUT) by decreasing a signaling overhead occurring when performing the IUT and by decreasing unnecessary attempt to perform the IUT.

Solution to Problem

According to an aspect of the present invention, a method of performing IUT by an IMS network in an IMS-based network system is provided. The method includes receiving from a first UE a subscription message for requesting notification of state or capability information of another UE, transmitting to the first UE a subscription acceptance message in response to the subscription message, receiving from a second UE a control message comprising an IUT flag for indicating IUT enable or disable for media flows, and transmitting to the first UE a notification message comprising information on the second UE, if the IUT flag indicates IUT enable for the media flows.

According to another aspect of the present invention, a method of performing IUT by an IMS network element in an IMS-based network system is provided. The method includes receiving from a UE a subscription message for requesting notification of a registration status of a different UE or state or capability information of the different UE, transmitting to the UE a subscription acceptance message in response to the subscription message, receiving from the different UE a control message comprising an IUT flag for indicating IUT enable or disable for media flows, and transmitting to the UE a notification message comprising the registration status of the different UE or the state or capability information of the different UE selectively according to the IUT flag.

Advantageous Effects of Invention

According to the present invention, it is possible to decrease a signaling overhead caused by a failure of inter-user equipment (UE) transfer (IUT) of a media flow and an overhead caused by notification of a change in state or capability information of a UE.

MODE FOR THE INVENTION

Hereinafter, exemplary embodiments of the present invention will be described in detail with reference to the accompanying drawings. The same reference numbers will be used throughout the drawings to refer to the same parts.

Figure 1:
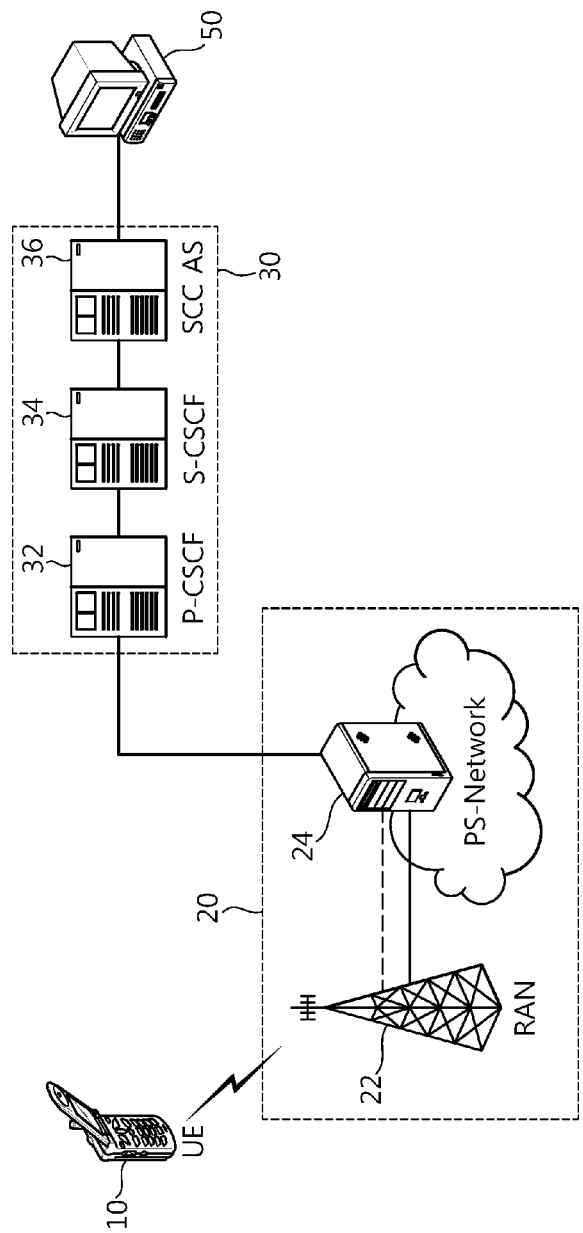
FIG. 1 shows a wireless communication system based on an Internet protocol (IP) multimedia subsystem (IMS).

FIG. 1 shows a wireless communication system based on an Internet protocol (IP) multimedia subsystem (IMS).

Referring to FIG. 1, the IMS-based wireless communication system includes a user equipment (UE) 10, a mobile communication network 20, and an IMS network 30.

The UE 10 is an apparatus for communication with network nodes constituting the IMS network or with another UE through a radio access network (RAN) such as an evolved-UMTS terrestrial radio access network (E-UTRAN). The term "UE" 10 is not particularly limited thereto. For example, the UE 10 may also be referred to as a mobile station (MS), a user terminal (UT), a mobile equipment (ME), a subscriber station (SS), a wireless device (or a wireless station), etc. The UE 10 is generally a mobile apparatus, but may also be a fixed apparatus. Examples of the mobile apparatus include a laptop, a personal digital assistant (PDA), a smart phone, a multimedia device, etc. Examples of the fixed apparatus include a personal computer (PC), a television, a fixed display device, etc. The UE 10 may have a unique identifier (ID) and IP address (or simply, IP addr). The ID may be a public user ID in a format of a session initiation protocol (SIP) uniform resource identifier (URI) or a TEL URI. Constitutional elements of the UE 10 are described in detail with reference to FIG. 2.

Figure 2:
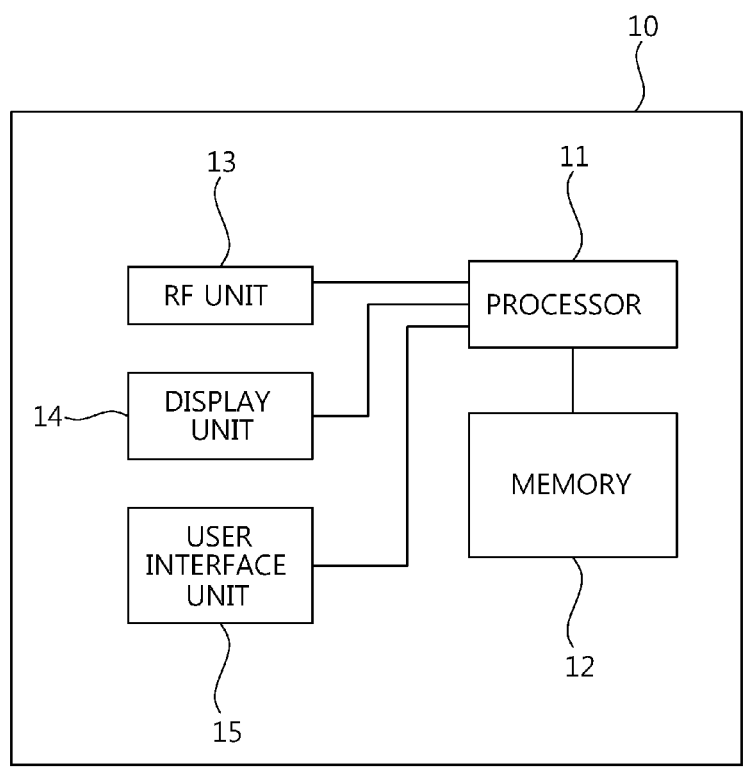
FIG. 2 is a block diagram showing constitutional elements of a UE.

FIG. 2 is a block diagram showing constitutional elements of a UE.

Referring to FIG. 2, a UE 10 includes a processor 11, a memory 12, a radio frequency (RF) unit 13, a display unit 14, and a user interface unit 15. The processor 11 implements various procedures for layers of a radio interface protocol, a wireless protocol, application protocol and a user interface protocol. Operations related to a procedure of generating and transmitting a register message for registration to an IMS network, a procedure of generating and transmitting an inter-UE transfer (IUT)-related message for performing IUT, and a session initiation/update procedure can be implemented by using the processor 11, and these procedures will be described below. The memory 12 is coupled to the processor 11 and stores an operating system of the UE, applications, and general files. The display unit 14 displays a variety of information of the UE and may use a well-known element such as a liquid crystal display (LCD), an organic light emitting diode (OLED), etc. The user interface unit 15 can be configured with a combination of well-known user interfaces such as a keypad, a touch screen, etc. The RF unit 13 is coupled to the processor 11 and transmits or receives radio signals.

Referring back to FIG. 1, the mobile communication network 20 routes an SIP message to achieve a call connection between the UE 10 and the IMS network 30. The mobile communication network 20 includes a radio access network (RAN) 22 and a packet switched (PS)-network 24.

The IMS network 30 includes a serving-call session control function (S-CSCF) 34 actually handling various sessions in a network, a proxy-call session control function (P-CSCF) 32 delivering an SIP message received from the UE 10 to the S-CSCF as a first access point to which the UE 10 is connected for access to the IMS network 30, and an service centralization and continuity application server (SCC AS) 36 as an application server supporting continuity of a multimedia session.

With regard to a session initiation to transmit and receive a media flow to and from a remote UE (i.e., a remote end) 50, the UE 10 first performs a registration procedure for notifying information related to its current location to the IMS network 30. The P-CSCF, the S-CSCF, and the SCC AS participate in the registration procedure. A process of registering a UE to an IMS network will be described hereinafter in detail.

Figure 3:
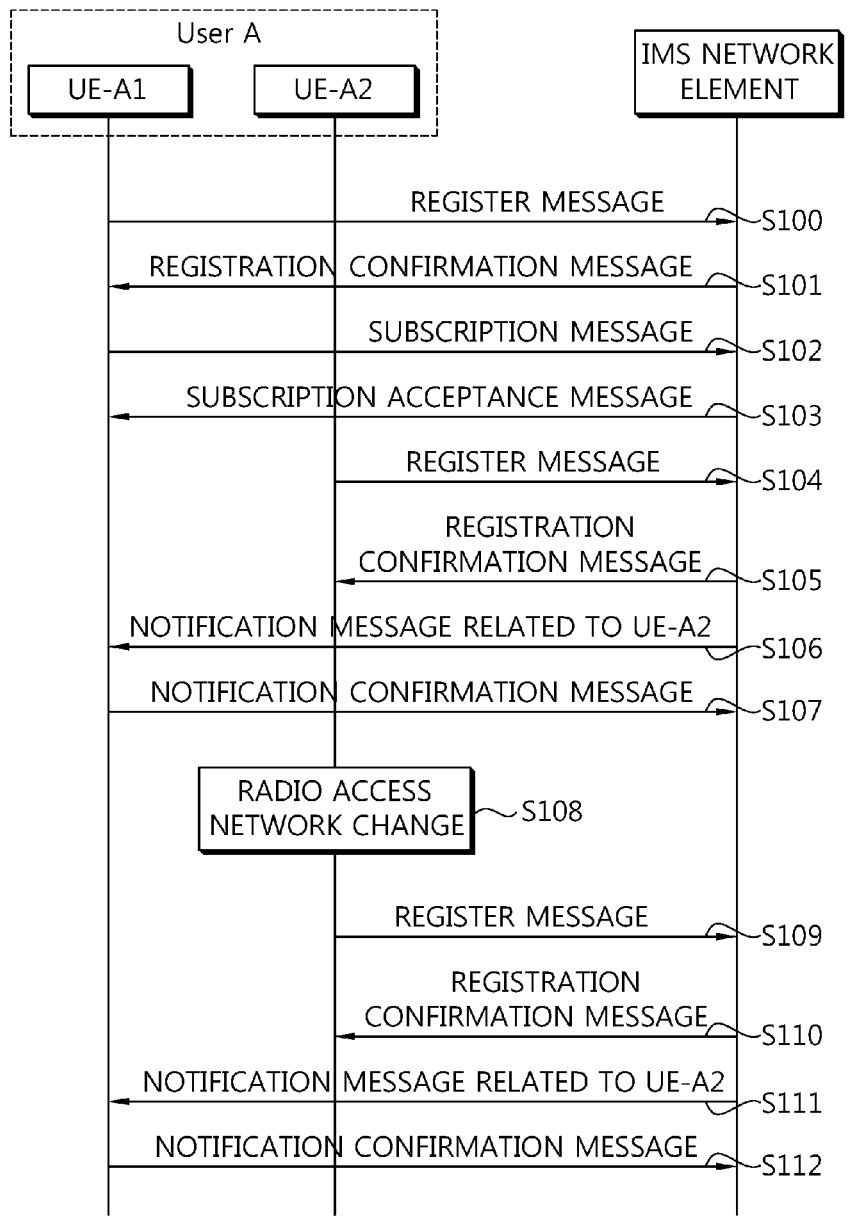
FIG. 3 is a flowchart for explaining a process of registering a UE to an IMS network.

FIG. 3 is a flowchart for explaining a process of registering a UE to an IMS network.

Referring to FIG. 3, a plurality of UEs (i.e., UE-A1 and UE-A2) sequentially perform the process of registering to the IMS network. The IMS network to which the plurality of UEs are registered is a home network. If an UE resides in a visited network, the UE is registered to the home network through the visited network. The UE-A1 and the UE-A2 may belong to the same user, or may belong to different users. The term "User" is not particularly limited thereto. For example, the user may also be referred to as a subscriber, an IMS subscription, a user subscription, a domain of a user, etc. Although it is shown in FIG. 3 that the UE-A1 and the UE-A2 belong to the same user (i.e., user A) for convenience of explanation, this is for exemplary purposes only, and thus the UE-A1 and the UE-A2 may belong to different users. Further, although only two UEs are shown in FIG. 3, a more number of associated UEs may be registered to the IMS network. An IMS network element is a physical or logical entity participating in the process of registering the UE to the IMS network, and may be a P-CSCF, an S-CSCF, or an SCC AS.

First, the UE-A1 transmits a register message (SIP REGISTER) to the IMS network element (step S100). The register message is an SIP message and includes state or capability information of the UE-A1. The state or capability information of the UE may include registration status information of the UE, information related to codec and media type supported by the UE, configuration related information such as a screen size, and information related to a radio access network to which the UE is currently connected. In addition, the state or capability information of the UE may be obtained from the UE in the IMS network via an OPTIONS message other than the register message. And if a database for managing the state or capability information of the UE exists, the state or capability information of the UE may be obtained from the database. If the UE-A1 exists in the visited network, the register message may be delivered to the S-CSCF (not shown in FIG. 3) via the P-CSCF (not shown in FIG. 3).

After registering the UE-A1, the IMS network element transmits a registration confirmation message (SIP 200 OK) to the UE-A1 (step S101). The UE-A1 transmits a subscription message (SIP SUBSCRIBE) to the IMS network element (step S102). If a specific UE desires to receive a service of notifying a change in state or capability information of another UE, the specific UE has to request the IMS network element to subscribe to an information change notification service. A message used in this step is the subscription message. The subscription message may also be referred to as an information notification subscription request message. The IMS network element transmits a subscription acceptance message to the UE-A1 to notify that the subscription is successfully performed (step S103).

Next, the UE-A2 is registered to the IMS network element (steps S104 and S105). The registration procedure is identical to the registration procedure performed by the UE-A1. When the UE-A2 is registered to the IMS network element, this is notified to the UE-A1 (step S106). A message used in this step is referred to as a notification message (SIP NOTIFY). Upon receiving the notification message, the UE-A1 transmits to the IMS network element a notification confirmation message for confirming reception of the notification message (step S107). The notification message is also transmitted when the UE-A2 moves to another radio access network. For example, if a connected radio access network changes when the UE-A2 moves (step S108), a new register message including information on the changed radio access network is transmitted to the IMS network element (step S109). As a result, a changed location of the UE-A2 is registered to the IMS network. In response thereto, the IMS network element transmits a registration confirmation message to the UE-A2 (step S110), and transmits a new notification message to the UE-A1 to notify the change in state information of the UE-A2 (step S111). The UE-A1 which additionally receives the notification message may transmit a notification confirmation message to the IMS network element to confirm reception of the notification message (step S112).

In this manner, a UE is registered to the IMS network and obtains state or capability information of another UE, and thus a media flow can be transferred between different UEs, added to different UE or removed from different UE. Such a transfer, an addition or a removal of the media flow between the UEs is referred to as inter-UE transfer (IUT). A part or entirety of the media flows can be transferred between a plurality of UEs by the IUT. Information related to performing the IUT may be included in the register message, or may be a separate control message. Meanwhile, the IUT is performed under the premise that a plurality of UEs are present. Hereinafter, the plurality of UEs supporting the IUT may belong to the same user, or may belong to different users.

Figure 4:
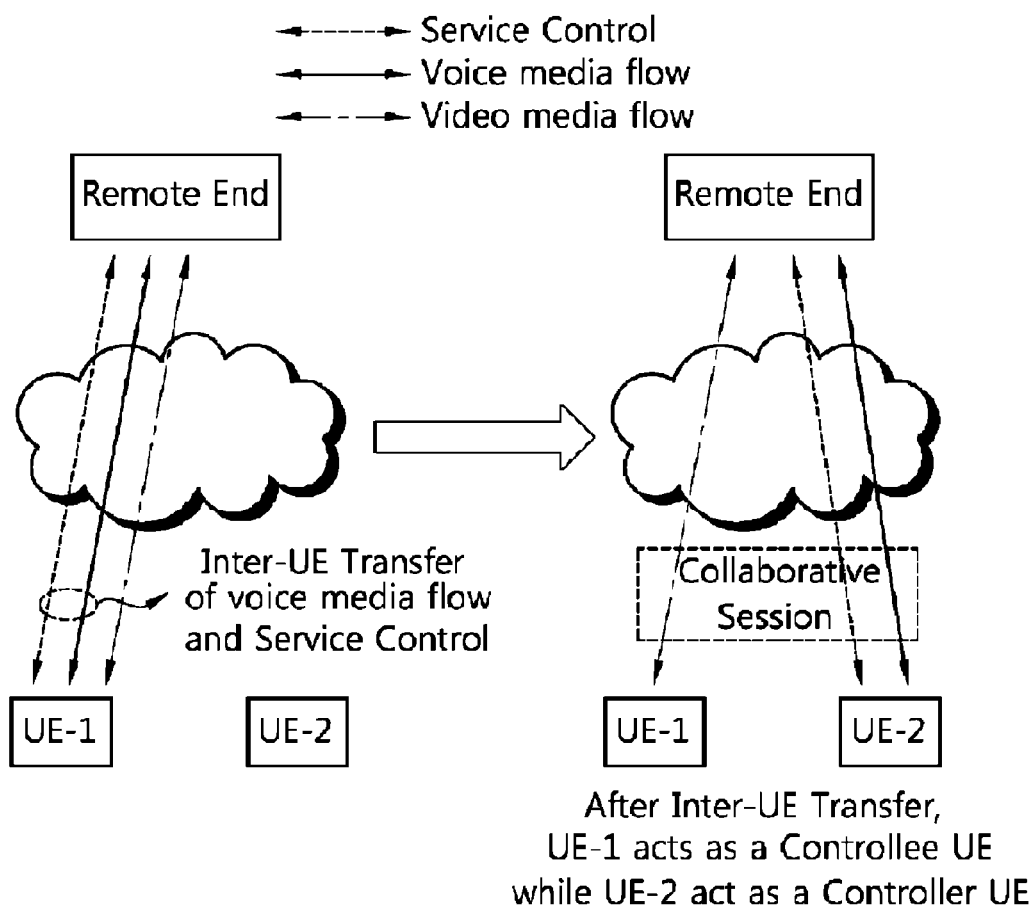
FIG. 4 shows a media flow transferred by IUT.

FIG. 4 shows a media flow transferred by IUT.

Referring to FIG. 4, a UE-1 communicates with a remote UE (i.e., a remote end) or a remote application server (hereinafter also referred to as a remote UE) through an IMS network. Herein, a voice media flow and a video media flow are provided between the UE-1 and the remote UE. The UE-1 has a service control right for the voice media flow and the video media flow. The media flow or the service control can be transferred between the UE-1 and a UE-2 by the IUT. The service control and the voice media flow are transferred from the UE-1 to the UE-2. After the transfer by the IUT, a video media flow session exists between the UE-1 and the remote UE, and a voice media flow session exists between the UE-2 and the remote UE. A plurality of sessions generated by the IUT are referred to as a collaborative session. Meanwhile, regarding the collaborative session, a UE providing the service control is referred to as a controller UE, and a UE providing the media flow is referred to as a controllee UE. The service control for the collaborative session provided by the controller UE is also referred to as collaborative session control.

Figure 5:
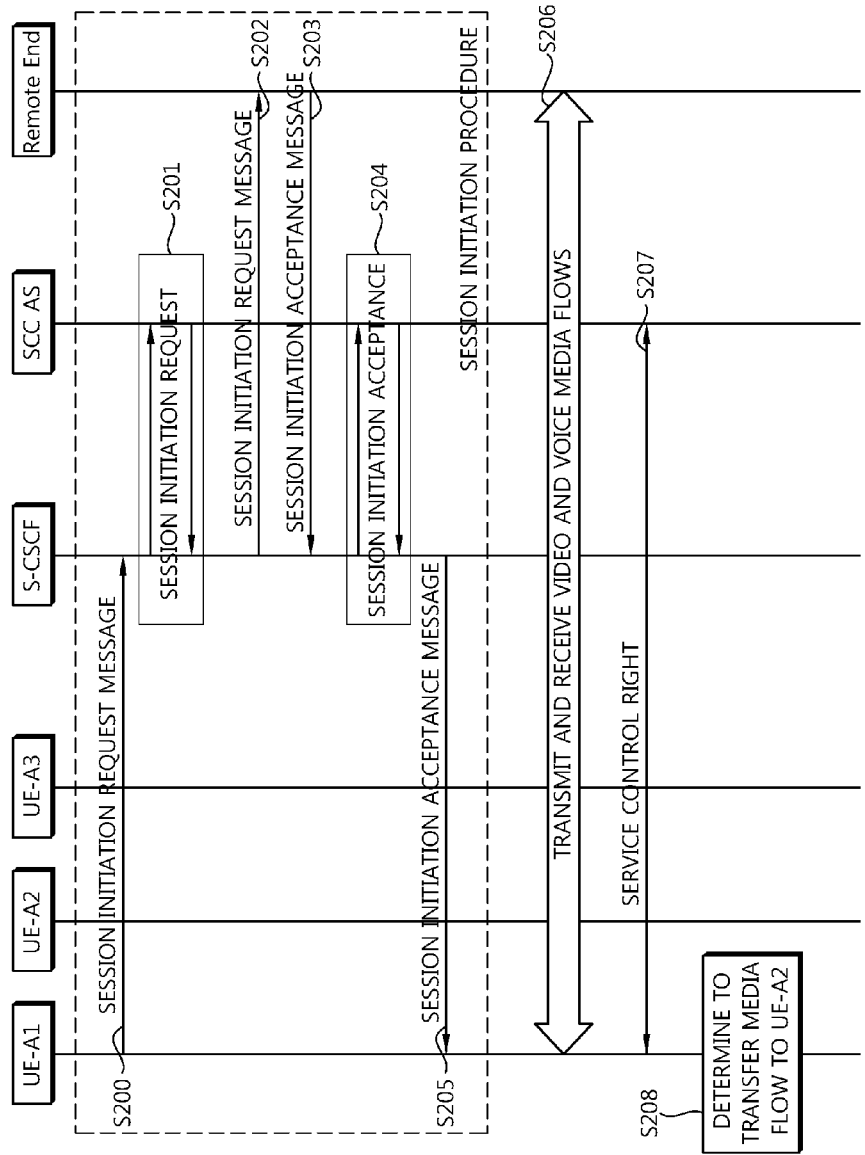
FIG. 5 and FIG. 6 are flowcharts for explaining a media flow transferred by IUT.
Figure 6:
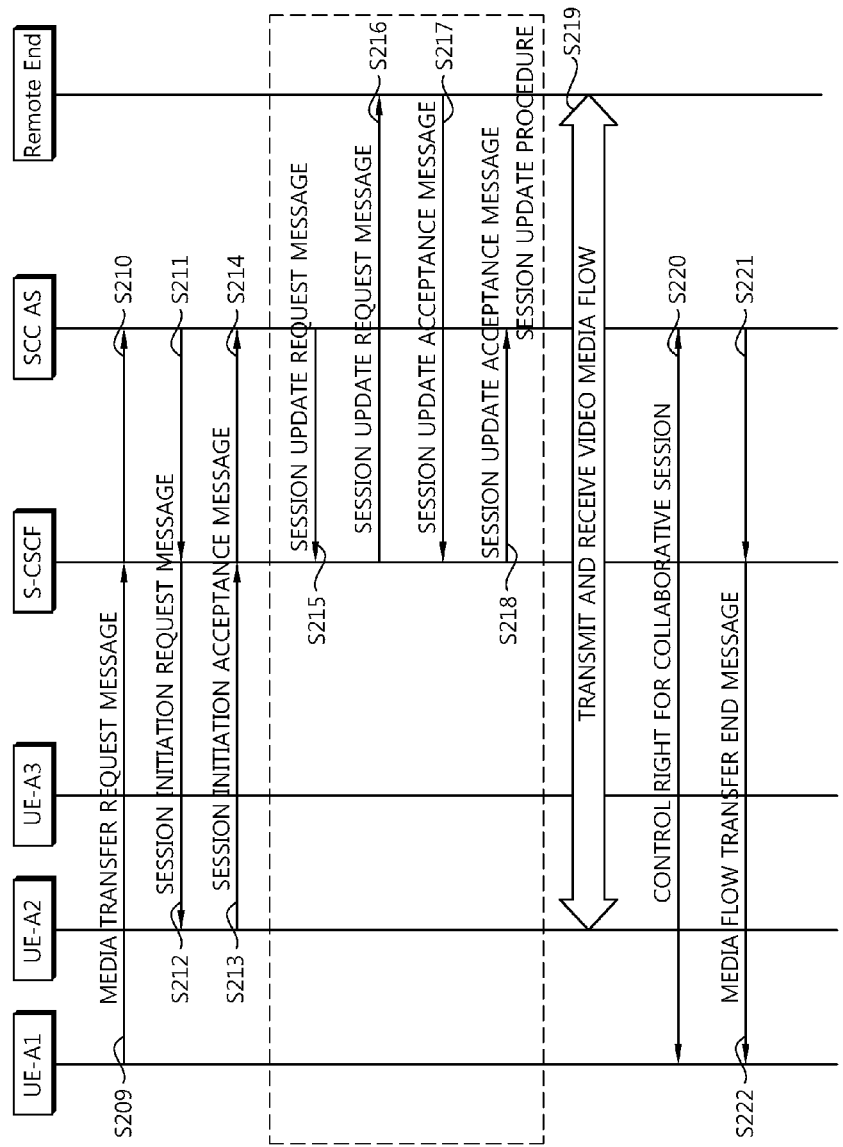

FIG. 5 and FIG. 6 are flowcharts for explaining a media flow transferred by IUT.

Referring to FIG. 5 and FIG. 6, it is assumed that there are UEs (i.e., a UE-A1, a UE-A2, and a UE-A3) able to perform the IUT, and all of these UEs are registered to an IMS network according to the registration process of FIG. 3. Meanwhile, the UE-A1 is a UE subscribed to an information change notification service to receive notification of state or capability information of a different UE, and thus when a state or capability of the different UE changes, the IMS network notifies this change to the UE-A1.

The UE-A1 transmits a session initiation request message (SIP INVITE) to an S-CSCF (step S200). Media to be provided through a session in this case is voice media and video media. On the basis of subscriber information of a user A, a session initiation request procedure is performed between the S-CSCF and an SCC AS (step S201). When the S-CSCF delivers the session initiation request message to a remote UE (step S202), the remote UE transmits a session initiation acceptance message to the S-CSCF (step S203). The session initiation acceptance message is an SIP message and is also referred to as 200 OK. After a session initiation acceptance procedure is performed between the S-CSCF and the SCC AS (step S204), the S-CSCF transmits the session initiation acceptance message to the UE-A1 (Step S205). The procedure of steps S200 to S205 is hereinafter referred to as a session initiation procedure.

By using a session initiated as described above, voice and video media flows are transmitted and received between the UE-A1 and the remote UE (step S206), and the UE-A1 has a service control right for the voice and video media flows (step S207).

The UE-A1 determines to transfer the video media flow to the UE-A2 (step S208). Since the UE-A1 is a user equipment, it can be said that whether to transfer the video media flow is actually determined by the user A. Of course, the media flow may be transferred regardless of an intention of the user A who is a user of the UE-A1 or without interaction with user A if a certain condition is satisfied.

The UE-A1 transmits a media transfer request message to the S-CSCF (step S209), and the S-CSCF transmits the media transfer request message to the SCC AS (step S210). A type of transferred media may be any one or both of the video and voice media. It is assumed herein that only the video media is transferred. Thereafter, a session is established between the UE-A2 and the S-CSCF/SCC AS, and a session initiation procedure for performing media transfer is performed. When the SCC AS transmits a session initiation request message to the S-CSCF (step S211), the S-CSCF transmits it to the UE-A2 (step S212). In response thereto, if the UE-A2 transmits a session initiation acceptance message to the S-CSCF (step S213), the S-CSCF delivers it to the SCC AS (step S214). If the SCC AS transmits a session update request message to the S-CSCF (step S215), the S-CSCF transmits the session update request message to the remote UE (step S216). In response thereto, the remote UE transmits a session update acceptance message to the S-CSCF (step S217), and the S-CSCF delivers the session update acceptance message to the SCC AS (step S218). The procedure of steps S215 to S218 is hereinafter referred to as a session update procedure.

If the session update procedure ends, a video media flow is provided between the UE-A2 and the remote UE (step S219). As a result of the media transfer, voice and video media flows which are conventionally provided by one UE are separately provided by a plurality of UEs. That is, the voice media flow is provided between the UE-A1 and the remote UE, and the video media flow is provided between the UE-A2 and the remote UE. However, the UE-A1 still has a control right for a collaborative session consisting of the voice and video media flows (step S220). Even if the media flow or the collaborative session control is transferred between UEs by the IUT, session continuity can be ensured. Finally, when the SCC AS transmits a media flow transfer end message to the S-CSCF (step S221), the S-CSCF delivers it to the UE-A1 (step S222).

When performing the IUT, occasionally, some UEs may not be able to support the IUT. For example, assume that the UE-A3 is in a situation where it cannot perform the IUT. In this case, although the UE-A1 cannot transfer a media flow to the UE-A3, an IMS network element may transmit a notification message to the UE-A1 whenever state or capability information of the UE-A3 changes, which causes a signaling overhead. In addition, since the UE-A1 cannot know which UE is currently able or unable to perform the IUT, an unnecessary process of transferring the media flow to a UE unable to perform the IUT may be attempted. To solve this problem, an IUT flag is used as a control message for effectively performing the IUT.

The IUT flag is an indicator for indicating whether a UE is able or unable to perform the IUT. For example, if the IUT flag is a 1-bit indicator, the IUT flag set to '0' may indicate IUT enable, and the IUT flag set to '1' may indicate IUT disable. Of course, this is for exemplary purposes only, and thus what indicated by bit information 0 or 1 may be used in an opposite manner, and the number of bits in use may be variable. The IMS network element may selectively transmit a notification message by checking the IUT flag. For example, if an IUT flag of the UE-A2 indicates IUT enable, the IMS network element notifies a registration status of the UE-A2 or state or capability information of the UE-A2 to the UE-A1 which is a specific UE subscribed to an information change notification service.

In this case, the state or capability information may include information indicating registration status information of the UE, information related to codec and media type supported by the UE, configuration related information such as a screen size, and information related to a radio access network to which the UE is currently connected.

On the other hand, if the IUT flag of the UE-A2 indicates IUT disable, the IMS network element does not notify to the UE-A1 the registration status of the UE-A2 or the state or capability information of the UE-A2. Accordingly, the IMS network element can selectively transmit the notification message and thus a signaling overhead is reduced, and the UE-A1 does not have to attempt unnecessary IUT for the UE that is unable to perform the IUT.

The IUT flag may be included in either a register message or a separate SIP message. It is assumed hereinafter that the IUT flag is included in the register message for convenience of explanation.

Figure 7:
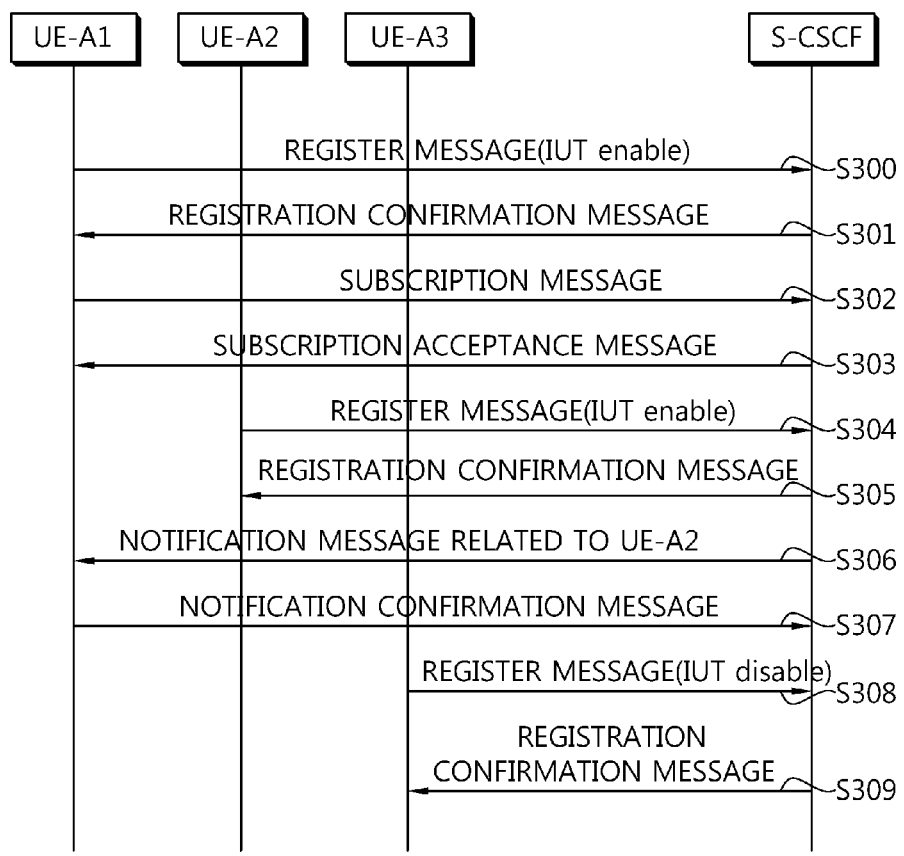
FIG. 7 is a flowchart showing a method of performing IUT according to an embodiment of the present invention.

FIG. 7 is a flowchart showing a method of performing IUT according to an embodiment of the present invention. In this case, an S-CSCF is used as an IMS network element for transmitting a notification message when performing the IUT.

Referring to FIG. 7, a UE-A1, a UE-A2, and a UE-A3 sequentially perform a process of registering to an IMS network. First, the UE-A1 transmits a register message including an IUT flag to the S-CSCF to register to the IMS network (step S300). In this case, the IUT flag indicates IUT enable. The S-CSCF may store the IUT flag of the UE-A1. When the UE-A1 is registered, the S-CSCF transmits a registration confirmation message (SIP 200 OK) to the UE-A1 (step S301). To receive notification of a change in state or capability information of another UE, the UE-A1 transmits a subscription message (SIP SUBSCRIBE) to the S-CSCF (step S302), and in response thereto, the S-CSCF transmits a subscription acceptance message to the UE-A1 (step S303).

Next, the UE-A2 performs a registration process (steps S304 and S305). In this case, the S-CSCF may store an IUT flag of the UE-A2. Since the IUT flag of the UE-A2 indicates IUT enable, the S-CSCF transmits to the UE-A1 a notification message (SIP NOTIFY) for notifying that the UE-A2 is registered to the IMS network (step S306). In response thereto, the UE-A1 transmits to the S-CSCF a notification confirmation message for indicating that the notification is confirmed (step S307). Finally, the UE-A3 performs a registration process (steps S308 and S309). Unlike the UE-A1 and the UE-A2, an IUT flag of the UE-A3 indicates IUT disable. That is, the UE-A3 cannot participate in the IUT. Therefore, the S-CSCF does not transmit a separate notification message to the UE-A1 for notifying the registration of the UE-A3. Accordingly, it is possible to decrease a signaling overhead caused by a failure of IUT of a media flow and an overhead caused by unconditional notification of a change in state or capability information of a UE.

A reason that transmission of the notification message of the S-CSCF is triggered is described in FIG. 7 only for a case where a UE is registered. However, this is for exemplary purposes only, and thus the present invention can also apply to all cases where state or capability information of the UE changes. Examples of such cases are where the registration of the UE is released or a radio access network changes, or where capability information of the UE changes. In addition, as described above, the UE-A1, the UE-A2, and the UE-A3 may belong to the same user A, or may belong to different users.

Figure 8:
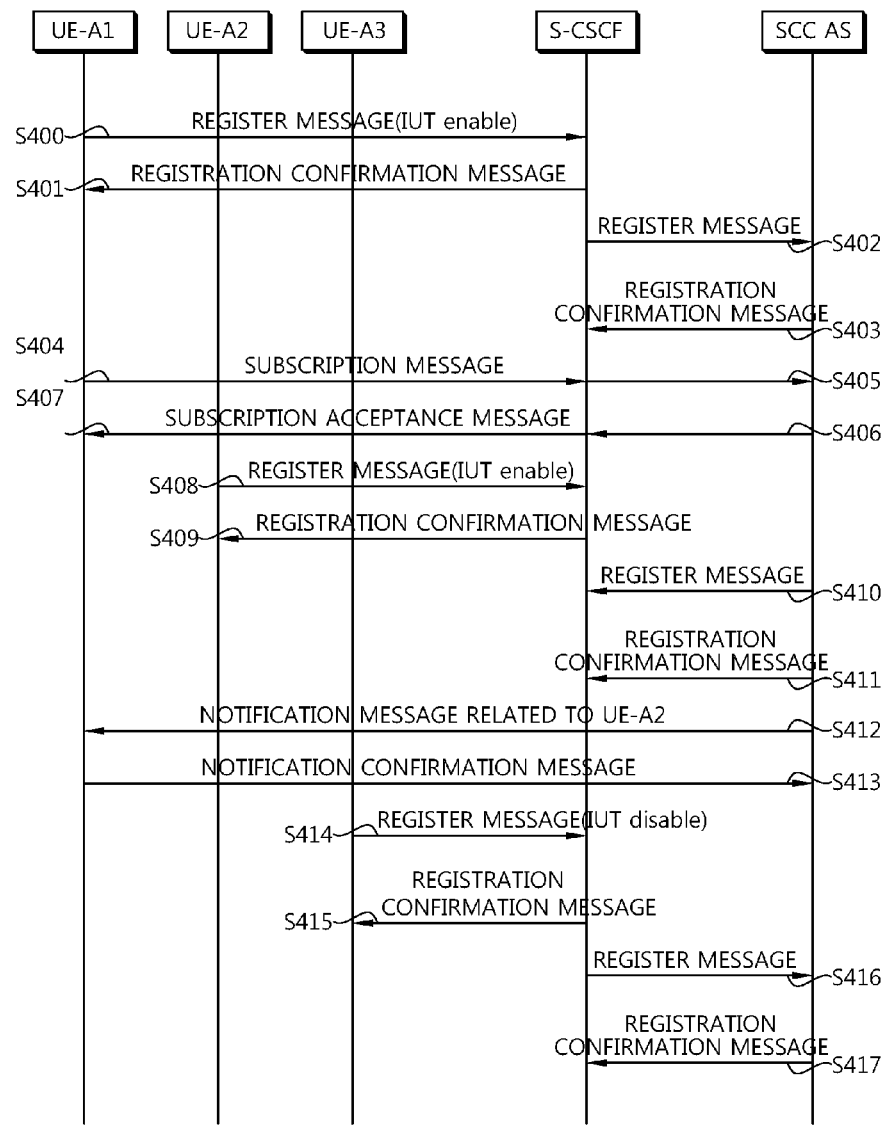
FIG. 8 is a flowchart showing a method of performing IUT according to another embodiment of the present invention.

FIG. 8 is a flowchart showing a method of performing IUT according to another embodiment of the present invention. In this case, an SCC AS is used as an IMS network element for transmitting a notification message when performing the IUT.

Referring to FIG. 8, a UE-A1, a UE-A2, and a UE-A3 sequentially perform a process of registering to an IMS network. First, the UE-A1 transmits a register message (SIP REGISTER) including an IUT flag to an S-CSCF to register to the IMS network (step S400). In this case, the IUT flag indicates IUT enable. When the UE-A1 is registered, the S-CSCF transmits a registration confirmation message (SIP 200 OK) to the UE-A1 (step S401). In association with the registration of the UE-A1, the S-CSCF delivers to the SCC AS the register message including the IUT flag received from the UE-A1 (step S402), and receives a registration confirmation message from the SCC AS (step S403). The SCC AS may store an IUT flag of the UE-A1.

To receive notification of a change in state or capability information of another UE, the UE-A1 transmits a subscription message (SIP SUBSCRIBE) to the S-CSCF (step S404), and the S-CSCF delivers it to the SCC AS (step S405). In response thereto, the SCC AS transmits a subscription acceptance message to the S-CSCF (step S406), and the S-CSCF delivers it to the UE-A1 (step S407).

Next, the UE-A2 performs a registration process (steps S408, S409, S410, and S411). Since the IUT flag of the UE-A2 indicates IUT enable, the SCC AS transmits to the UE-A1 a notification message (SIP NOTIFY) for notifying that the UE-A2 is registered to the IMS network (step S412). In response thereto, the UE-A1 transmits to the SCC AS a notification confirmation message for indicating that the notification is confirmed (step S413).

Finally, the UE-A3 performs a registration process (steps S414, S415, S416, and S417). Unlike the UE-A1 and the UE-A2, an IUT flag of the UE-A3 indicates IUT disable. That is, the UE-A3 cannot participate in the IUT. Therefore, the SCC AS does not have to transmit to the UE-A1 a separate notification message for notifying the registration of the UE-A3.

Figure 9:
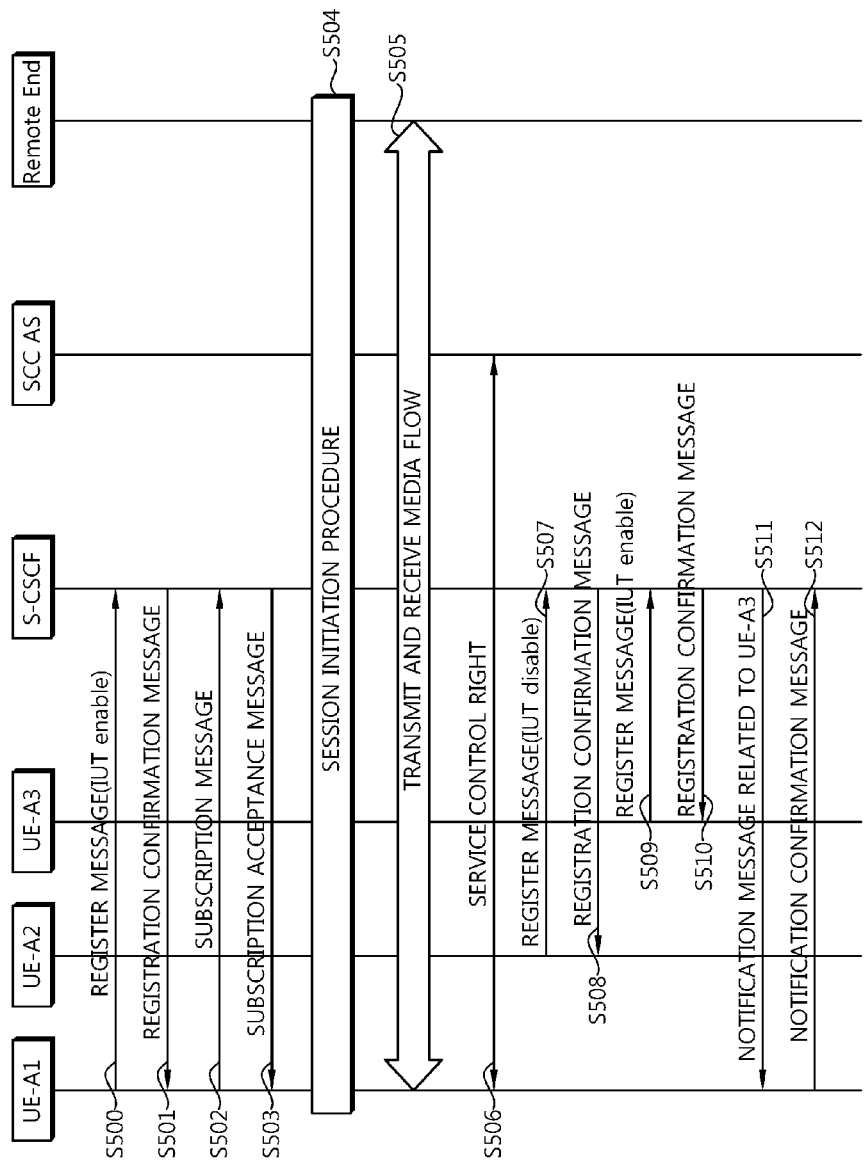
FIG. 9 is a flowchart showing a method of performing IUT according to another embodiment of the present invention.

FIG. 9 is a flowchart showing a method of performing IUT according to another embodiment of the present invention. In this case, an S-CSCF is used as an IMS network element for transmitting a notification message when performing the IUT. A process of transferring a media flow between UEs will be described.

Referring to FIG. 9, first, a UE-A1 transmits a register message including an IUT flag to the S-CSCF to register to an IMS network (step S500). In this case, the IUT flag indicates IUT enable. The S-CSCF may store the IUT flag of the UE-A1. When the UE-A1 is registered, the S-CSCF transmits a registration confirmation message to the UE-A1 (step S501). To receive notification of a change in state or capability information of another UE, the UE-A1 transmits a subscription message to the S-CSCF (step S502), and in response thereto, the S-CSCF transmits a subscription acceptance message to the UE-A1 (step S503). Meanwhile, if a session initiation procedure is performed according to a session initiation request of the UE-A1 (step S504), video and voice media flows are transmitted between the UE-A1 and a remote UE (step S505), and the UE-A1 has a service control right for the video and voice media flows (step S506).

Next, a UE-A2 performs a registration process (steps 507 and S508). Since an IUT flag of the UE-A2 indicates IUT disable, the S-CSCF does not transmit to the UE-A1 a notification message for notifying that the UE-A2 is registered to the IMS network.

The UE-A1 does not know that the UE-A2 is registered to the IMS network, and thus does not attempt to transfer the media flow to the UE-A2.

Finally, a UE-A3 performs a registration process (steps S509 and S510). Since an IUT flag of the UE-A3 indicates IUT enable, the S-CSCF transmits to the UE-A1 a notification message for notifying that the UE-A3 is registered to the IMS network (step S511). In response thereto, the UE-A1 transmits to an S-CSCF a notification confirmation message for indicating that the notification is confirmed (step S512).

UEs currently registered to the IMS network are the UE-A1, the UE-A2, and the UE-A3, and among them, the UE-A2 is a UE unable to perform the IUT. Therefore, the IUT cannot be performed between the UE-A1 and the UE-A2, and the IUT can be performed between the UE-A1 and the UE-A3. The UE-A1 may consider a transfer of the media flow to the UE-A3.

In addition to the IUT flag, user preference or priority information related to the IUT may be included. For example, priorities among UEs with respect to the video media flow, priorities among UEs with respect to a role of a controller UE, or the like may be included.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing inter-user equipment (UE) transfer (IUT) of a collaborative session including media flows and a control of the media flows by an Internet protocol (IP) multimedia subsystem (IMS) network in an IMS-based network system, the method comprising:
   receiving from a first UE a subscription message for requesting notification of state or capability information of another UE;
   transmitting to the first UE a subscription acceptance message in response to the subscription message;
   receiving from a second UE a control message comprising an IUT flag for indicating either IUT enablement for the collaborative session or disablement for the collaborative session, the IUT enablement indicating that the second UE is capable of performing the IUT and the IUT disablement indicating the second UE is incapable of performing the IUT; and
   determining whether to transmit a notification message comprising information on the second UE to the first UE, based on the IUT flag in the control message,
   wherein if the IUT flag in the control message indicates the IUT enablement for the collaborative session, the notification message comprising information on the second UE is transmitted to the first UE such that the first UE is capable of determining, based on the notification message, whether to transfer to the second UE some or all of the collaborative session which is proceeded with a remote party and includes the media flows and the control of the media flows, and
   wherein if the IUT flag in the control message indicates the IUT disablement for the media flows, the notification message comprising information on the second UE is not transmitted to the first UE.

2. The method of claim 1, wherein the information on the second UE comprises a registration status of the second UE or state or capability information of the second UE.

3. The method of claim 2, wherein the state or capability information of the second UE comprises registration status information of the second UE, information related to codec and media type supported by the second UE, configuration related information such as a screen size, and information related to a radio access network to which the second UE is currently connected.

4. The method of claim 1, wherein the control message is a register message used to register the second UE to the IMS network.

5. The method of claim 4, wherein the register message is a session initiation protocol (SIP) which is a signaling protocol usable for an IP-based multimedia service.

6. The method of claim 1, wherein the first and second UEs belong to the same user.

7. The method of claim 1, wherein the first and second UEs belong to different users.

8. The method of claim 1, further comprising:
receiving from the first UE a transfer request message for requesting a transfer of the media flow to the second UE; and
initiating a new media flow session for transferring the media flow to the second UE.

9. The method of claim 8, wherein the transfer request message comprises information related to a UE to which the media flow is transferred.

10. The method of claim 8, wherein the media flow is at least one of a plurality of different media flows.

11. The method of claim 8, wherein the first UE has a control right for the media flow.

12. A method of performing inter-user equipment (UE) transfer (IUT) of a collaborative session including media flows and a control of the media flows by an Internet protocol (IP) multimedia subsystem (IMS) network element in an IMS-based network system, the method comprising:
receiving from a UE a subscription message for requesting notification of a registration status of one different UE or state or capability information of the different UE;
transmitting to the UE a subscription acceptance message in response to the subscription message;
receiving from the different UE a control message comprising an IUT flag for indicating either IUT enablement for the collaborative session or disablement for the collaborative session, the IUT enablement indicating that the second UE is capable of performing the IUT and the IUT disablement indicating the second UE is capable of performing the IUT; and
determining whether to transmit a notification message comprising the registration status of the different UE or the state or capability information of the different UE to the UE, based on the IUT flag in the control message,
wherein the notification message is transmitted if the IUT flag in the control message indicates the IUT enablement for the collaborative session such that the UE is capable of determining, based on the notification message, whether to transfer to the different UE some or all of the collaborative session which is proceeded with a remote party and includes the media flows and the control of the media flows, and
wherein the notification message is not transmitted if the IUT flag in the control message indicates the IUT disablement for the media flows.

13. The method of claim 12, wherein, if the IUT flag indicates the IUT enablement for the media flows, the notification message is transmitted to the UE, and otherwise, the notification message is not transmitted to the UE.

14. The method of claim 12, wherein the IUT network element is a serving-call session control function (S-CSCF).

15. The method of claim 12, wherein the IMS network element is a service centralization and continuity application server (SCC AS) which is an application server supporting session continuity of the media flow.

* * * * *